US009529645B2

(12) United States Patent
Srinivas et al.

(10) Patent No.: US 9,529,645 B2
(45) Date of Patent: Dec. 27, 2016

(54) METHODS AND APPARATUS TO MANAGE SPECULATIVE EXECUTION OF OBJECT LOCKS BY DIVERTING THE SPECULATIVE EXECUTION OF TARGET CODE

(71) Applicant: Intel Corporation, Santa Clara, CA (US)

(72) Inventors: Suresh Srinivas, Portland, OR (US); Stephen H. Dohrmann, Hillsboro, OR (US); Mingqiu Sun, Beaverton, OR (US); Uma Srinivasan, Sunnyvale, CA (US); Ravi Rajwar, Portland, OR (US); Konrad K. Lai, Vancouver, WA (US)

(73) Assignee: Intel Corporation, Santa Clara, CA (US)

( * ) Notice: Subject to any disclaimer, the term of this patent is extended or adjusted under 35 U.S.C. 154(b) by 10 days.

(21) Appl. No.: 14/635,790

(22) Filed: Mar. 2, 2015

(65) Prior Publication Data

US 2015/0169384 A1    Jun. 18, 2015

Related U.S. Application Data

(63) Continuation of application No. 12/645,668, filed on Dec. 23, 2009, now Pat. No. 8,972,994.

(51) Int. Cl.
*G06F 9/52* (2006.01)
*G06F 9/455* (2006.01)
(Continued)

(52) U.S. Cl.
CPC .......... *G06F 9/528* (2013.01); *G06F 9/45516* (2013.01); *G06F 9/526* (2013.01); *G06F 8/458* (2013.01);
(Continued)

(58) Field of Classification Search
None
See application file for complete search history.

(56) References Cited

U.S. PATENT DOCUMENTS 5,768,593 A * 6/1998 Walters ............... G06F 9/45516
703/26
5,926,631 A    7/1999 McGarvey
(Continued)

FOREIGN PATENT DOCUMENTS

| EP | 1074916 | 2/2001 |
| EP | 1265137 | 12/2002 |
| WO | 0215003 | 2/2002 |

OTHER PUBLICATIONS

Col et al, Tolerating Dependences Between Large Speculative Threads via Sub-Threads, 2006, IEEE, Proceedings of the 33rd International Symposium on Computer Architecture (ISCA'06), pp. 1-11.*

(Continued)

*Primary Examiner* — Abu Ghaffari
(74) *Attorney, Agent, or Firm* — Hanley, Flight & Zimmerman, LLC

(57) ABSTRACT

Example methods and apparatus to manage object locks are disclosed. A disclosed example method includes intercepting a processor request to apply the lock on the object, identifying a performance history of the object based on a number of instances of contention, reducing computing resources of the processor by, when the number of instances is below a threshold value, generating a lock bypass for the object to cause speculative execution of target code within the object, and preventing speculative execution by applying the lock on the object when the number of instances is above the threshold value.

17 Claims, 11 Drawing Sheets

(51) Int. Cl.
G06F 17/30 (2006.01)
G06F 9/38 (2006.01)
G06F 9/45 (2006.01)

(52) U.S. Cl.
CPC ....... *G06F 9/3842* (2013.01); *G06F 17/30168* (2013.01); *G06F 17/30362* (2013.01); *Y10S 707/99938* (2013.01)

(56) References Cited

U.S. PATENT DOCUMENTS

| | | | |
|---|---|---|---|
| 6,144,983 A | 11/2000 | Klots et al. | |
| 6,496,922 B1 | 12/2002 | Borrill | |
| 6,637,025 B1 | 10/2003 | Beadle et al. | |
| 6,654,954 B1 | 11/2003 | Hicks | |
| 6,671,707 B1 | 12/2003 | Hudson et al. | |
| 6,684,398 B2* | 1/2004 | Chaudhry | G06F 9/3842 711/145 |
| 7,058,929 B2 | 6/2006 | Charnell et al. | |
| 7,325,118 B2 | 1/2008 | Lee | |
| 7,603,663 B2 | 10/2009 | Wu et al. | |
| 7,634,639 B2 | 12/2009 | Chaudhry et al. | |
| 7,890,738 B2* | 2/2011 | Eisen | G06F 9/3844 712/239 |
| 8,060,880 B2 | 11/2011 | Cherem et al. | |
| 8,176,491 B1* | 5/2012 | Plummer | G06F 9/526 717/136 |
| 8,196,122 B2 | 6/2012 | McCrady et al. | |
| 8,266,607 B2* | 9/2012 | Burka | G06F 9/528 717/131 |
| 8,578,354 B2 | 11/2013 | Young et al. | |
| 8,949,583 B1* | 2/2015 | Tene | G06F 9/3001 712/228 |
| 8,972,994 B2 | 3/2015 | Srinivas et al. | |
| 2001/0042241 A1 | 11/2001 | Tsuboi | |
| 2002/0049865 A1 | 4/2002 | Charnell et al. | |
| 2002/0144240 A1 | 10/2002 | Lueh et al. | |
| 2002/0194483 A1 | 12/2002 | Wenocur et al. | |
| 2004/0015874 A1 | 1/2004 | Ungar | |
| 2004/0068727 A1* | 4/2004 | Zilles | G06F 8/456 718/100 |
| 2004/0078674 A1 | 4/2004 | Raimi et al. | |
| 2004/0111714 A1 | 6/2004 | Shi et al. | |
| 2004/0162948 A1* | 8/2004 | Tremblay | G06F 9/30116 711/137 |
| 2006/0149696 A1 | 7/2006 | Pferdekaemper et al. | |
| 2007/0136289 A1 | 6/2007 | Adl-Tabatabai et al. | |
| 2007/0186215 A1* | 8/2007 | Rajwar | G06F 9/3004 718/102 |
| 2008/0244544 A1 | 10/2008 | Neelakantam et al. | |
| 2010/0023707 A1* | 1/2010 | Hohmuth | G06F 9/466 711/152 |
| 2010/0169623 A1 | 7/2010 | Dice | |
| 2011/0153992 A1 | 6/2011 | Srinivas et al. | |

OTHER PUBLICATIONS

IBM, Minimizing Lock Contention by Collective Computation, IP.com, 2009, pp. 1-3.*
Blanchet, "Escape Analysis for Object Oriented Languages: Application to Java," Dec. 1999, retrieved from delivery.acm.org/10.1145/330000/320387/p20-blanchet.pdf>, (15 pages).
BEAJRrockit, "Using the BEAJRockit Runtime Analyzer," BEA Systems, Inc., Jun. 2005 (38 pages).
Orp.sourceforge.net, "Open Runtime Platform: Open Source Dynamic Computing Research Platform," retrieved from orp.sourceforge.net>, retrieved on Jul. 2, 2009 (1 page).
International Searching Authority, "Written Opinion," issued in connection with International Patent Application No. PCT/US2004/008589, mailed Dec. 10, 2004 (6 pages).
International Searching Authority, "International Search Report" issued in connection with International Patent Application No. PCT/US2003/38825, mailed May 6, 2005 (4 pages).
Ruf, "Effective Synchronization Removal for Java," ACM SIGPLAN Conference on Programming Language Design and Implementation (PLDI'2000), Vancouver, British Columbia, Canada, 2000 (11 pages).
Bogda et al., "Removing Unnecessary Synchronization in Java," Proceedings of the 14th Annual ACM SIGPLAN Conference on Object-Oriented Programming Systems, Languages, and Applications, Denver, CO, Nov. 1, 1999, (12 pages).
Choi et al., "Escape Analysis for Java," Proceedings of the 1999 ACM SIGPLAN Conference on Object-Oriented Programming, Systems, Languages, and Applications, Denver, CO, Nov. 1, 1999, (19 pages).
Whaley et al., "Compositional Pointer and Escape Analysis for Java Programs," Proceedings of the 14th Annual ACM SIGPLAN Conference on Object-Oriented Programming Systems, Languages, and Applications. Denver, CO, Nov. 1, 1999 (20 pages).
United States Patent and Trademark Office, "Notice of Allowance," issued in connection with U.S. Appl. No. 10/441,357, mailed on Jun. 3, 2009 (11 pages).
United States Patent and Trademark Office, "Non-Final Office Action," issued in connection with U.S. Appl. No. 10/441,357, mailed Nov. 13, 2007, (10 pages).
United States Patent and Trademark Office, "Non-Final Office Action," issued in connection with U.S. Appl. No. 10/441,357, mailed Sep. 22, 2006 (10 pages).
United States Patent and Trademark Office, "Final Office Action," issued in connection with U.S. Appl. No. 10/441,357, mailed Aug. 26, 2008 (12 pages).
United States Patent and Trademark Office, "Final Office Action," issued in connection with U.S. Appl. No. 10/441,357, mailed May 8, 2007 (12 pages).
United States Patent and Trademark Office, "Advisory Action," issued in connection with U.S. Appl. No. 10/441,357, mailed Sep. 12, 2007 (3 pages).
Microsoft Corporation, "Native Image Generator (Ngen.exe)," retrieved from <msdn.microsoft.com/library/en-us/cptools/html/cpgrfnativeimagegeneratorngenexe.asp>, retrieved on Jun. 24, 2003 (2 pages).
United States Patent and Trademark Office, "Examiner's Answer to Appeal Brief," issued in connection with U.S. Appl. No. 10/327,848, mailed Sep. 18, 2008 (22 pages).
United States Patent and Trademark Office, "Non-Final Office Action," issued in connection with U.S. Appl. No. 10/327,848, mailed Jan. 8, 2007 (14 pages).
United States Patent and Trademark Office, "Non-Final Office Action," issued in connection with U.S. Appl. No. 10/327,848, mailed Dec. 15, 2005, (18 pages).
United States Patent and Trademark Office, "Notice of Non-Compliance," issued in connection with U.S. Appl. No. 10/327,848, mailed Jul. 16, 2008 (2 pages).
United States Patent and Trademark Office, "Final Office Action," issued in connection with U.S. Appl. No. 10/327,848, mailed Jul. 6, 2007 (22 pages).
United States Patent and Trademark Office, "Final Office Action," issued in connection with U.S. Appl. No. 10/327,848, mailed May 22, 2006 (27 pages).
United States Patent and Trademark Office, "Advisory Action," issued in connection with U.S. Appl. No. 10/327,848, mailed Sep. 25, 2007 (3 pages).
United States Patent and Trademark Office, "Advisory Action," issued in connection with U.S. Appl. No. 10/327,848, mailed Nov. 2, 2006 (3 pages).
Rajwar et al., "Speculative Lock Elision: Enabling Highly Concurrent Multithreaded Execution," Proceedings of the 34th International Symposium on Microarchitecture (MICRO), Dec. 3-5, 2001, (12 pages).
Goetz, "Whitepaper: Optimistic Thread Concurrency: Breaking the Scale Barrier," Azul Systems, 2009 (12 pages).
Bacon et al., "Thin Locks: Featherweight Synchronization for Java," Nov. 16, 2005, (25 pages).
Sarkar et al., "High-Performance Scalable Java Virtual Machines," 2001, retrieved from hipc.org/public/2001/proceedings/lncs2228/22280147/paperpdf> (13 pages).

(56) References Cited

OTHER PUBLICATIONS

Teodor et al., "Lock-Free Read Set Structure for Software Transactional Memory," 2008 (8 pages).
Carter, "PC Assembly Language," retrieved from drpaulcarter.com/pcasm/pcasm-book.pdt.gz>, Jul. 23, 2006 (195 pages).
Koch et al., "Efficient Hardware Checkpointing: Concepts, Overhead Analysis, and Implementation," FPGA'07 Proceedings of the 2007 ACM/SIGDA 15th International Symposium on Filed Programmable Gate Arrays, Feb. 18-20, 2007 (9 pages).
Venners, "Thread Synchronization," Chapter 20 of Inside the Java Virtual Machine, 1996-2009, Artima, Inc. (9 pages).
International Searching Authority, "International Search Report," issued in connection with International Patent Application No. PCT/US2004/008589, mailed Dec. 10, 2004 (3 pages).
Suganuma et al., "A Dynamic Optimization Framework for a Java Just-In-Time Compiler," OOPSLA '01 Proceedings of the 16th ACM SIGPLAN Conference on Object-Oriented Programming, Systems, Language, and Applications, ACM, New York New York, 2001 (16 pages).
United States Patent and Trademark Office, "Non-Final Office Action," issued in connection with U.S. Appl. No. 12/645,668, mailed Aug. 21, 2012 (12 pages).
United States Patent and Trademark Office, "Final Office Action," issued in connection with U.S. Appl. No. 12/645,668, mailed Dec. 20, 2012 (13 pages).
United States Patent and Trademark Office, "Non-Final Office Action," issued in connection with U.S. Appl. No. 12/645,668, mailed Dec. 6, 2013 (11 pages).
United States Patent and Trademark Office, "Final Office Action," issued in connection with U.S. Appl. No. 12/645,668, mailed Apr. 24, 2014 (11 pages).
United States Patent and Trademark Office, "Notice of Allowance," issued in connection with U.S. Appl. No. 12/645,668, mailed Oct. 21, 2014 (13 pages).

\* cited by examiner

250

| OBJECT NAME | LOCK-BYPASS SUCCESS COUNT | LOCK-BYPASS FAIL COUNT | THRESHOLD VALUE(S) | SKIP? |
|---|---|---|---|---|
| 252 | 254 | 256 | 258 | 260 |
| ... | ... | ... | ... | ... |
| ... | ... | ... | ... | ... |
| ... | ... | ... | ... | ... |
| ... | ... | ... | ... | ... |
| ... | ... | ... | ... | ... |
| ... | ... | ... | ... | ... |

FIG. 2B

METHODS AND APPARATUS TO MANAGE SPECULATIVE EXECUTION OF OBJECT LOCKS BY DIVERTING THE SPECULATIVE EXECUTION OF TARGET CODE

CROSS REFERENCE TO RELATED APPLICATION

This patent is a continuation of and claims priority to U.S. application Ser. No. 12/645,668 filed Dec. 23, 2009, entitled "Methods and Apparatus to Manage Object Locks," which is hereby incorporated herein by reference in its entirety.

TECHNICAL FIELD

The present disclosure relates to speculative execution, and in particular, to methods and apparatus to manage object locks.

BACKGROUND

Managed runtime environments allow software applications to be written in a single programming language and execute a software application on a variety of platforms having dissimilar hardware, operating systems, etc. The ability to execute on a variety of platforms is sometimes referred to as software application portability. Programming languages that are used with managed runtime environments include Java, C#, etc., create intermediate code (e.g., byte-code, dynamic program language instructions, etc.) that can be disseminated to any number of platforms. The managed runtime environment operating at any given platform typically receives and interprets the intermediate code and/or otherwise tailors the intermediate code to operate in a platform-specific manner.

Managed runtime environments are typically implemented as just-in-time (JIT) compilers that receive the intermediate language code (dynamic program language instructions) and convert such code into native or machine code specific to the platform that is to execute the intermediate language code. To improve the speed at which intermediate language code may execute, multi-threading techniques are employed that enable concurrent threads of execution to share or access an object without causing a conflict or contention. Synchronization is typically employed to ensure thread-safe operation for execution of multiple threads at substantially the same time and/or the execution of multiple threads in an alternate order. Generally speaking, synchronization may ensure thread-safe operation by limiting and/or otherwise locking access to a given object so that only a single thread may have access thereto.

BRIEF DESCRIPTION OF THE DRAWINGS

FIG. 2B is a table of an example forecaster table that may be used by the example lock-bypass manager of FIG. 2A.

DETAILED DESCRIPTION

Synchronization techniques enable multiple concurrent and/or substantially concurrent threads of execution to share access to a given object and its variables without causing a conflict and/or contention with one or more alternate threads. In operation, example synchronization techniques may check for a concurrent use of an object of interest and, if such concurrent use is occurring, disallow any attempts to access the object of interest. Synchronization techniques may employ object locks so that an active thread enjoys exclusive access to the object of interest. When the active thread has completed its use of the object of interest, the lock may be released so that one or more alternate threads may acquire their own lock over the object of interest, thereby allowing further execution on and/or with the object of interest.

Unfortunately, synchronization techniques consume processing resources and such processing overhead may affect execution time of a managed runtime environment (e.g., a reduction in execution time of a just-in-time (JIT) compiler). For example, an object that is to be used in a first and second thread is first locked by the first thread, the first thread executes, the first thread releases the lock on the object, and then the second lock acquires a lock on the object before executing. While the first thread executes, the second thread may spin and/or otherwise wait for the first thread to relinquish control over a locked object. Such synchronization techniques result in threads executing in a sequential manner, which may require mutex operations and/or other processor intensive procedures.

The example methods and apparatus described herein allow, in part, conditional application of object locks that is based on whether or not a contention exists between one or more executing threads. Additionally, the example methods and apparatus described herein allow a managed runtime environment to invoke instructions associated with any number of specific instruction set architectures (ISAs) to provide assistance during one or more speculation operations(s). Rather than consuming platform processor resources to acquire and/or release locks on all objects that might be shared by one or more executing threads, the example methods and apparatus described herein allow interception of locks, processor requests to apply locks, and/or runtime environment requests to apply locks. As such, the methods and apparatus described herein allow object locks to be deferred and/or eliminated, thereby conserving processor resource burdens during speculation operation(s).

Figure 1:
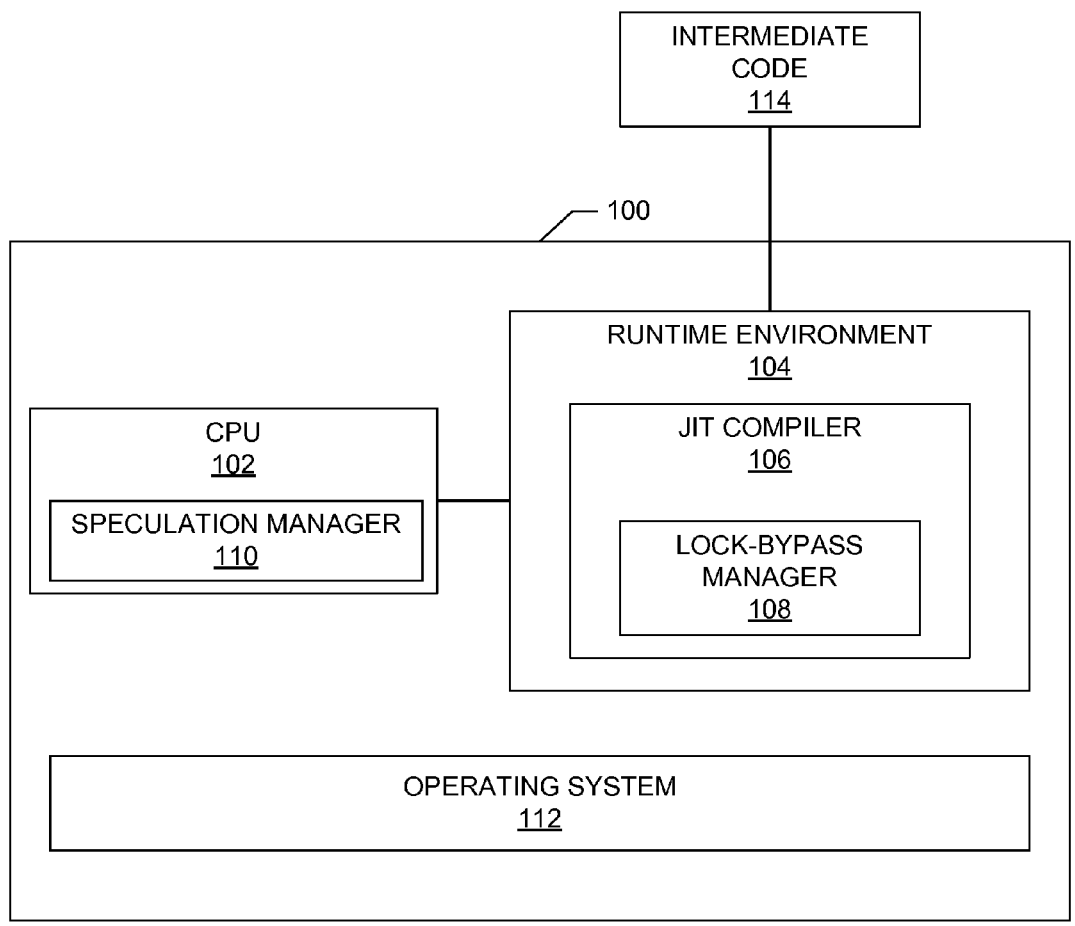
FIG. 1 is a block diagram of an example platform that may be used by the methods and apparatus described herein to manage object locks.

FIG. 1 is a schematic illustration of an example platform 100 that may be used with the methods and apparatus described herein. In the illustrated example of FIG. 1, the platform 100 includes a CPU 102, a runtime environment 104, a JIT compiler 106, a lock-bypass manager 108, a speculation manager 110, and an operating system 112. A language complier (not shown) may be used to compile one or more applications to generate intermediate code 114. In the event that the one or more applications are written using the Java® programming language, then the example intermediate code 114 will include bytecodes. In the illustrated example of FIG. 1, the example compiled intermediate code 114 is external to the platform 100 (e.g., a target computer system), but may be stored in an external memory (not shown), a memory within the example platform 100 and/or received directly from an intranet, network (wired, wireless, etc.) and/or the Internet.

In operation, the example operating system 112 may host the runtime environment 104 to execute one or more portions of the compiled intermediate code 114. As described above, if the compiled intermediate code 114 includes Java® bytecodes, then the example runtime environment 104 may be a Java Virtual Machine (JVM), but any other type and/or variety of runtime environment 104 may be used. The example JIT compiler 106 compiles the intermediate code 114 to generate native and/or machine code that may be executed by the example CPU 102. To eliminate instances of conflict, in which more than one thread attempts to access the same software object, the runtime environment 104 may synchronize the software object (referred to herein generally as an "object"). Generally speaking, dynamic programming languages, such as, for example, Java®, provide synchronization primitives to facilitate thread-safe software objects. In some instances, programmers may explicitly insert software lock and unlock functions (e.g., mutexes) to protect objects from multiple thread access at one time. In other instances, the native dynamic programming language takes a conservative approach and automatically invokes software lock and unlock mechanisms (e.g., monitor-enter, monitor-exit, etc.) to prevent more than one thread from substantially simultaneously accessing an object of interest. As described above, when a lock is taken on an object, other threads that wish to access the object typically spin. Additionally, processing resources are consumed when taking a lock on an object that may hinder platform performance.

Creating a lock for each object used by the example runtime environment 104 involves complex code executed by the JIT compiler 106 and creates a substantial burden on the CPU 102. In some instances, the runtime environment 104 and/or the JIT compiler 106 was responsible for both acquiring/releasing object locks and managing checkpoints in case a processor/CPU state needed to be restored. Although the safest approach for executing intermediate code without object contention is to set-up and tear-down object locks, one or more performance metrics of the example platform 100 may suffer. For example, applications executing on the example platform may execute more slowly due to substantial CPU and/or memory resources required for operations related to lock acquisition and release. Additionally, in the event that no actual contention occurs, any CPU resources consumed to acquire (set-up) and release (tear-down) an object lock are wasted. To that end, the lock-bypass manager 108 operates, in some examples, in a manner responsive to a speculation notification request by the runtime environment 104 and intercepts one or more requests to acquire an object lock.

As described in further detail below, the example speculation manager 110 may be part of the CPU 102 and implemented by the CPU manufacturer to generate (e.g., via one or more ISA-specific instructions) one or more checkpoints during thread execution. Accordingly, any burden associated with the runtime environment 104 to execute code directed to checkpoint creation is abated, thereby improving overall platform 100 performance. In other words, the methods and apparatus described herein do not expose a programmer to new, additional and/or alternate programming constructs specific to the ISA, but rather enable legacy code to take advantage of one or more hardware features in a transparent manner. Additionally, the example lock-bypass manager 108 intercepts any instructions typically provided by the runtime environment 104 to immediately obtain a lock for the object of interest until the lock-bypass manager 108 can be certain that a lock is actually needed. Further platform 100 performance benefits may result when some objects are allowed to have one or more threads accesses without a lock. For example, multiple threads that read an object value will not typically result in any risk of contention, thus, lock acquisition in view of such multiple thread read operations may be avoided.

Further, the methods and apparatus described herein are not limited to multi threaded applications, but may also improve platform performance in single threaded environments. For example, a single thread that calls a synchronized method typically incurs CPU overhead due to, in part, traditional safety measures of obtaining thread identifiers from thread local storage (TLS). A lock type of compare-and-exchange ("cmpxchg"), which has some atomic guarantee, is invoked to swing a lock word to the thread identifiers. Based on, in part, the fact that only a single thread is accessing the object of interest, the cmpxchg will succeed. However, even though the cmpxchg is considered a lightweight lock, the example runtime environment 104 and/or JIT compiler 106 still has to perform approximately nine (9) instructions to complete.

In the event a contention is detected to occur, the example lock-bypass manager 108 allows one or more locks to be generated before one or more threads can cause any unsafe contention behavior, as described in further detail below.

While the illustrated example of FIG. 1 includes the lock-bypass manager 108 within the example JIT compiler 106, the methods and apparatus described herein are not limited thereto. For example, the example lock-bypass manager 108 may be located externally to the example JIT compiler 106, externally to the example runtime environment 104 or externally to the example platform 100.

Figure 2A:
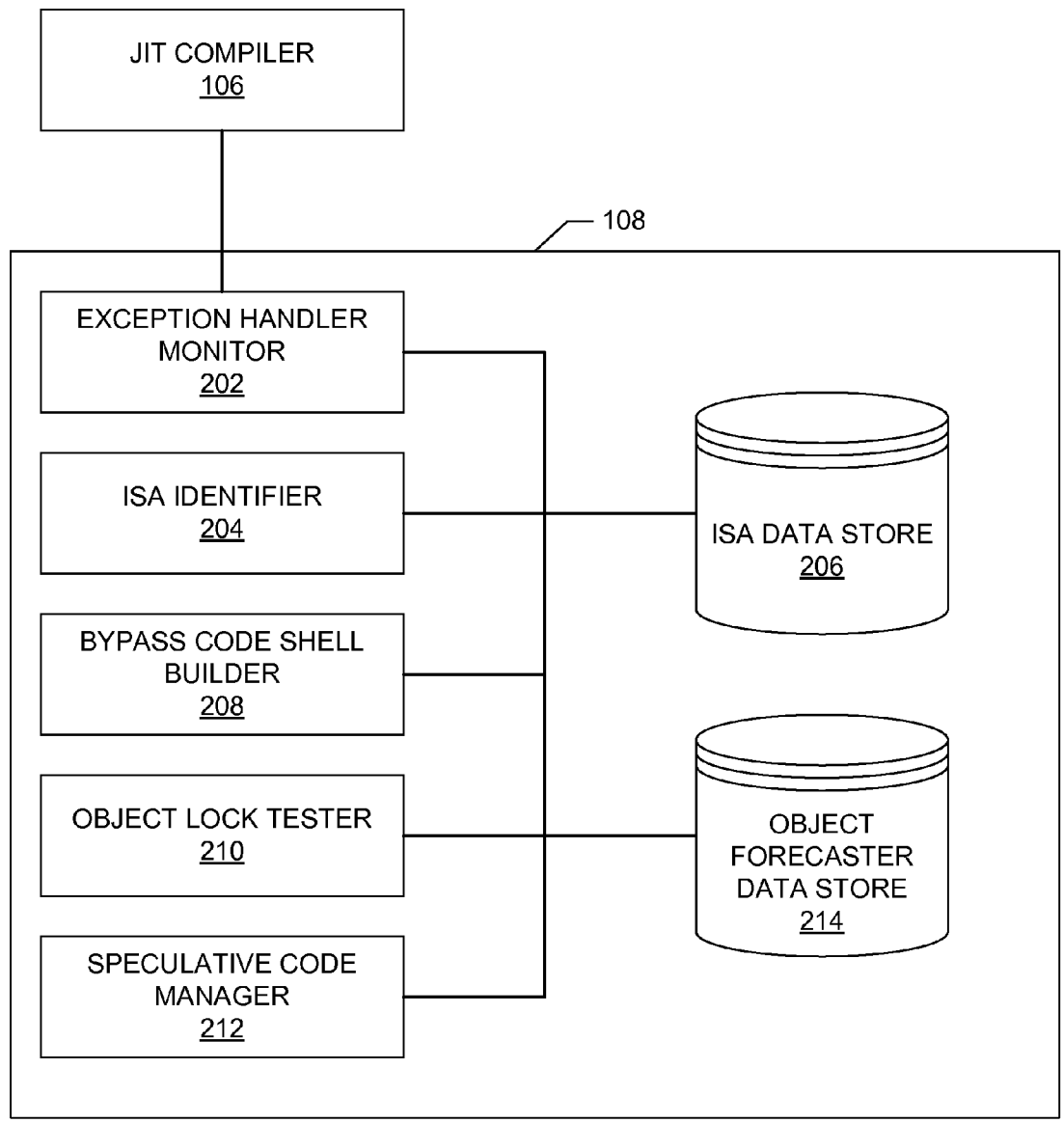
FIG. 2A is a block diagram of an example lock-bypass manager that may be used by the example platform of FIG. 1.

FIG. 2A is a schematic illustration of the example lock-bypass manager 108 of FIG. 1. In the illustrated example of FIG. 2A, the lock-bypass manager 108 includes an exception handler monitor 202, an ISA identifier 204, an ISA data store 206, a bypass code shell builder 208, an object lock tester 210, a speculative code manager 212 and an object forecaster data store 214. The example exception handler monitor 202 is communicatively connected to the example JIT compiler 106 and monitors for an instance of a checkpoint creation request, which typically occurs prior to one or more object lock requests of speculative execution. In some examples, the exception handler monitor 202 monitors the runtime environment 104 and/or the example JIT compiler 106 for checkpoint creation operation(s) and/or other instances where a checkpoint is requested and/or created. Unlike typical software-based speculation techniques, the example methods and apparatus described herein respond to one or more speculation execution attempts by invoking ISA-specific instructions for checkpoint creation to ease runtime code complexity, and intercept immediate requests to acquire object locks unless and/or until such locks are proven necessary.

In some examples, the exception handler monitor 202 queries the object forecaster data store 214 in response to receiving an indication of one or more requests for speculative execution to determine whether the object associated with the speculative execution should be considered as a candidate for lock-bypassing. In other words, some objects are not suitable candidates for lock-bypass based on, for example, frequent observation of contention, large size and/or a high likelihood for contention due to frequent I/O calls. As such, the example exception handler monitor 202 determines whether the object forecaster data store 214 includes an indication that the object of interest is to be allowed lock-bypass attempts. The example object forecaster data store 214 may include a list of objects that are not ideal candidates for lock-bypass techniques, thereby allowing the example lock-bypass manager 108 to skip over one or more requests for lock-bypass activities in response to receiving an indication of speculative execution associated with that object of interest.

In the illustrated example of FIG. 2B, a forecaster table 250 is stored in the example object forecaster data store 214 of FIG. 2A and includes an object name column 252 to name any number of objects of interest. The example forecaster table 250 also includes an example lock-bypass success count column 254, a lock-bypass fail count column 256, a threshold value column 258, and a skip column 260. In operation, a query may be made to the example forecaster table 250 occurs in response to the example lock-bypass manager 108 receiving an object name associated with an object of interest that has an associated request for lock placement. If the object name of interest is not found in the example forecaster table 250, then the methods and apparatus described herein may proceed to attempt to bypass acquisition of one or more locks on the associated object of interest. On the other hand, in the event that the object name of interest is found in the example object name column 252, then the example ISA identifier 204 may evaluate the example lock-bypass success count column 254 and/or the example lock-bypass fail count column 256 to determine whether one or more thresholds in the example threshold value column 258 have been exceeded. For instance, the example ISA identifier 204 may calculate a ratio of successful lock-bypass attempts (column 254) to failed lock-bypass attempts (column 256) to determine whether one or more thresholds (column 258) are within boundary limit(s). If so, then the example skip column 260 may indicate a "no" value and/or any other indicia (e.g., 0, zero, etc.) that will allow the object of interest to serve as a candidate for lock-bypass. On the other hand, in the event one or more thresholds are exceeded, then the example skip column 260 may indicate a "yes" value and/or any other indicia (e.g., 1) that will prevent the object of interest from serving as a candidate for lock-bypass.

Returning to FIG. 2A, the example ISA identifier 204 determines an ISA with which the CPU 102 is associated and queries the example ISA data store 206 to retrieve one or more instructions and/or handles associated with the identified ISA. Each ISA may have unique low level instructions to, for example, save all register states as a checkpoint, provide an insertion point for an abort handler in case a transaction aborts, atomically commit buffered memory updates, discarding buffered memory updates in favor of checkpoint instructions (in the case of an abort) and/or read status registers to obtain information related to reasons for an abort of a transaction. Knowledge of the specific CPU 102 ISA allows the example lock-bypass manager 108 to invoke resources of the CPU 102 to accomplish some of the activity associated with speculative execution rather than force the runtime environment 104 and/or the JIT compiler 106 to perform all speculative execution via software-based techniques. At least one benefit of invoking resources of the CPU 102 during managed code speculative execution is a reduction in complexity for runtime environment execution code and improved execution times.

A code shell is generated by the example bypass code shell builder 208 when the example object forecaster data store 214 provides an indication that the object of interest may be a suitable candidate for lock-bypass operation(s). In other words, if the object of interest is not located within the example object forecaster data store 214, then the example lock-bypass manager 108 may proceed with one or more attempts to bypass an object lock operation on the object of interest. However, if future instances of contention are observed with the object of interest, then that object may be added to the example object forecaster data store 214 so that future attempts to bypass lock operation(s) are not attempted in connection with the object of interest. Bypass code is generated by the example bypass code shell builder 208 on-the-fly to allow, in part, invocation of hardware-based checkpoint activity and/or testing operation(s) on the object of interest to determine whether a lock can be bypassed.

As described in further detail below, the example object lock tester 210 determines if the object of interest is already locked and invokes one or more instructions to abort lock-bypass attempts. Additionally or alternatively, in the event of a prior lock on the object of interest, the example lock-bypass manager 108 may spin until the object of interest is no longer locked. However, in the event that the example object lock tester 210 determines that there is no lock on the object of interest, the example speculative code manager 212 allows one or more critical sections of code to execute, as described in further detail below.

Figure 3:
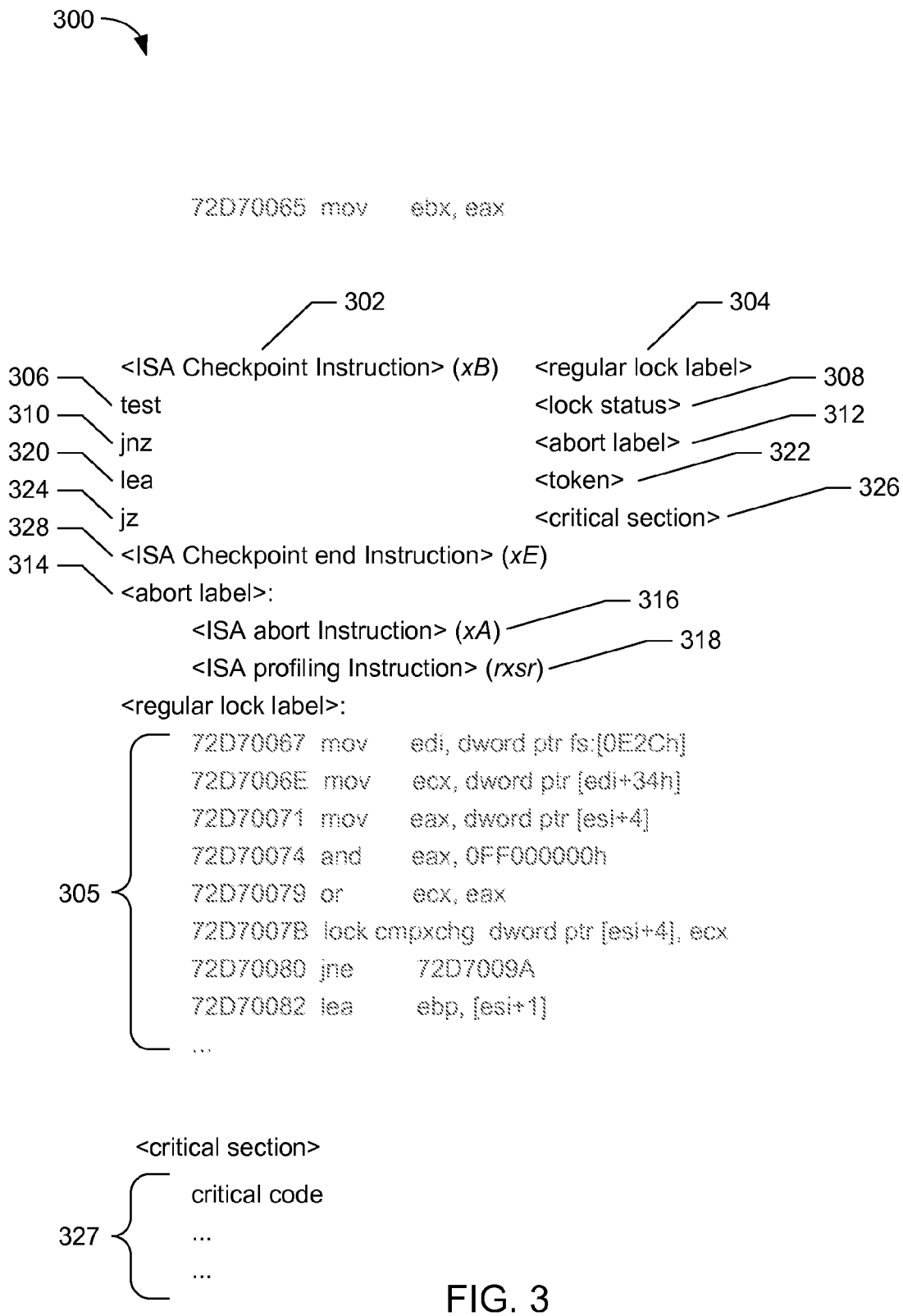
FIG. 3 is a listing of example lock-bypass code that may be generated by the example lock-bypass manager of FIGS. 1 and 2A.

FIG. 3 is an example code shell 300 generated by the example bypass code shell builder 208 of FIG. 2A. In the illustrated example of FIG. 3, the code shell 300 includes a checkpoint request placeholder 302 that is populated with a checkpoint request instruction obtained from the example ISA data store 206. As described above, the example ISA data store 206 includes ISA-specific instructions that may be invoked during speculative execution after the ISA type of the CPU 102 is determined by the example ISA identifier 204. The checkpoint request placeholder 302 may be populated with, for example, instruction xB to mark the start of speculative execution in the example CPU 102. Instruction xB may be selected by virtue of the ISA identifier determining the type of ISA for the CPU 102 and retrieving appropriate CPU 102 instructions from the ISA data store 206 that are associated with the ISA type. While the aforementioned ISA-specific checkpoint request instruction uses the nomenclature xB, such nomenclature is used for example purposes and not limitation. In other words, any type of ISA-specific instructions may be employed by the methods and apparatus described herein.

A example regular lock label placeholder 304 includes a label that allows execution of the example code shell 300 to proceed to regular lock placement on the object of interest in the event that a checkpoint rollback is needed. If the regular lock label 304 is invoked, control advances to regular lock instructions 305. The example code shell 300 also includes a test instruction 306 and a lock status label placeholder 308 to allow a test on the object of interest to determine if another thread currently has a lock placed on the object of interest. Briefly returning to FIG. 2A, in the event that a test instruction 306 is executed, the example object lock tester 210 may be invoked to determine whether or not the object currently has a lock placed thereon (e.g., a prior thread that has placed a lock on the object of interest).

If another thread happens to have a lock on the object of interest, then example code shell 300 includes a jump instruction 310 and a corresponding abort label placeholder 312 to allow a jump to an example abort label 314. The example code shell 300 includes an ISA-specific abort instruction placeholder 316 to hold one or more instructions related to hardware-based speculation abort. The example code shell 300 may insert abort instruction xA, which may be determined by the ISA identifier 204 query to the ISA data store 206 based on the type of ISA with which the CPU 102 is associated. The example xA instruction may be invoked to unconditionally abort the transaction by discarding all buffered memory states and restoring the saved register states from the earlier checkpoint. Additionally, to allow data acquisition of reasons why the speculative attempts failed, the example code shell 300 includes an ISA profiling instruction placeholder 318. An example rxsr instruction may be inserted by the code shell 300 based on that instruction being associated with the ISA-specific task(s) of revealing error register information, but the example instruction rxsr is used herein for example purposes only, and not limitation. The data collected from an ISA specific profiling instruction (e.g., rxsr) may reveal register fault codes and/or other state information that allows future object management. In other words, if the ISA profiling instruction (e.g., rxsr) reveals that the object of interest frequently experiences one or more thread contentions, then the object of interest may be added to the example object forecaster data store 214 to avoid any future attempts to bypass locking operation(s) on the object of interest.

On the other hand, in the event that a lock is not already taken on the object of interest, the example code shell 300 includes a load instruction 320 and a corresponding token placeholder 322 to indicate a successful entry of speculative execution. To allow execution of a section of code and/or requesting thread, the example code shell 300 includes a jump instruction 324 and a corresponding critical section label placeholder 326. Control then advances to critical code 327, thereby bypassing the CPU intensive regular lock instructions 305. The example speculative code manager 212 of FIG. 2A may monitor and/or otherwise manage operation of a critical section of code that is using the object of interest. After the thread(s) associated with the critical section complete, the example code shell 300 includes an ISA-specific checkpoint end instruction placeholder 328, which marks an end of speculative execution to the CPU 102. An example checkpoint end instruction xE may be inserted in the placeholder 328 by the example bypass code shell builder 208 in the event that the CPU 102 is associated with that ISA-specific instruction. However, the checkpoint end instruction xE is illustrated for example purposes and not by way of limitation. In response to invoking the example xE instruction, the code shell 300 signals successful completion of speculative execution. As described above, after a successful speculative execution, any registers saved via the checkpoint may be disregarded while buffered register values may be atomically committed and/or otherwise made permanent.

While the example platform 100 and lock-bypass manager 108 of FIGS. 1 and 2A have been shown to identify object candidates for lock-bypass and invoke hardware-based ISA-specific checkpointing tasks, one or more of the elements and/or devices illustrated in FIGS. 1 and 2A may be combined, divided, re-arranged, omitted, eliminated and/or implemented in any other way. Further, the example CPU 102, runtime environment 104, JIT compiler 106, lock-bypass manager 108, speculation manager 110, exception handler monitor 202, ISA identifier 204, ISA data store 206, bypass code shell builder 208, object lock tester 210, speculative code manager 212 and/or the example object forecaster data store 214 of FIGS. 1 and 2A may be implemented by one or more circuit(s), application specific integrated circuit(s) (ASIC(s)), programmable logic device(s) (PLD(s)), and/or field programmable logic device(s) (FPLD(s)), etc. When any of the appended apparatus claims are read to cover a purely software and/or firmware implementation, at least one of the example CPU 102, runtime environment 104, JIT compiler 106, lock-bypass manager 108, speculation manager 110, exception handler monitor 202, ISA identifier 204, ISA data store 206, bypass code shell builder 208, object lock tester 210, speculative code manager 212 and/or the example object forecaster data store 214 of FIGS. 1 and 2 are hereby expressly defined to include a tangible medium such as a memory, DVD, CD, etc. storing the software and/or firmware. Further still, the example CPU 102, runtime environment 104, JIT compiler 106, lock-bypass manager 108, speculation manager 110, exception handler monitor 202, ISA identifier 204, ISA data store 206, bypass code shell builder 208, object lock tester 210, speculative code manager 212 and/or the example object forecaster data store 214 of FIGS. 1 and 2A may include one or more elements, processes and/or devices in addition to, or instead of, those illustrated in FIGS. 1 and 2A, and/or may include more than one of any or all of the illustrated elements, processes and devices.

FIGS. 4-9 illustrate example processes that may be performed to implement the example lock-bypass manager 108 of FIGS. 1 and 2A. The example processes of FIGS. 4-9 may be carried out by a processor, a controller and/or any other suitable processing device. For instance, the example processes of FIGS. 4-9 may be embodied in coded instructions stored on any tangible computer-readable medium such as a flash memory, a CD, a DVD, a floppy disk, a read-only memory (ROM), a random-access memory (RAM), a programmable ROM (PROM), an electronically-programmable ROM (EPROM), and/or an electronically-erasable PROM (EEPROM), an optical storage disk, an optical storage device, magnetic storage disk, a magnetic storage device, and/or any other medium that can be used to carry or store program code and/or instructions in the form of machine-readable instructions or data structures, and that can be accessed by a processor, a general-purpose or special-purpose computer, or other machine with a processor (e.g., the example processor platform P100 discussed below in connection with FIG. 10). Combinations of the above are also included within the scope of computer-readable media. Machine-readable instructions comprise, for example, instructions and/or data that cause a processor, a general-purpose computer, a special-purpose computer, or a special-purpose processing machine to implement one or more particular processes. Alternatively, some or all of the example processes of FIGS. 4-9 may be implemented using any combination(s) of ASIC(s), PLD(s), FPLD(s), discrete logic, hardware, firmware, etc. Also, one or more operations of the example processes of FIGS. 4-9 may instead be implemented manually or as any combination of any of the foregoing techniques, for example, any combination of firmware, software, discrete logic, and/or hardware. Further, many other methods of implementing the example operations of FIGS. 4-9 may be employed. For example, the order of execution of the blocks may be changed, and/or one or more of the blocks described may be changed, eliminated, sub-divided, or combined. Additionally, any or all of the example processes of FIGS. 4-9 may be carried out sequentially and/or carried out in parallel by, for example, separate processing threads, processors, devices, discrete logic, circuits, etc.

Figure 4:
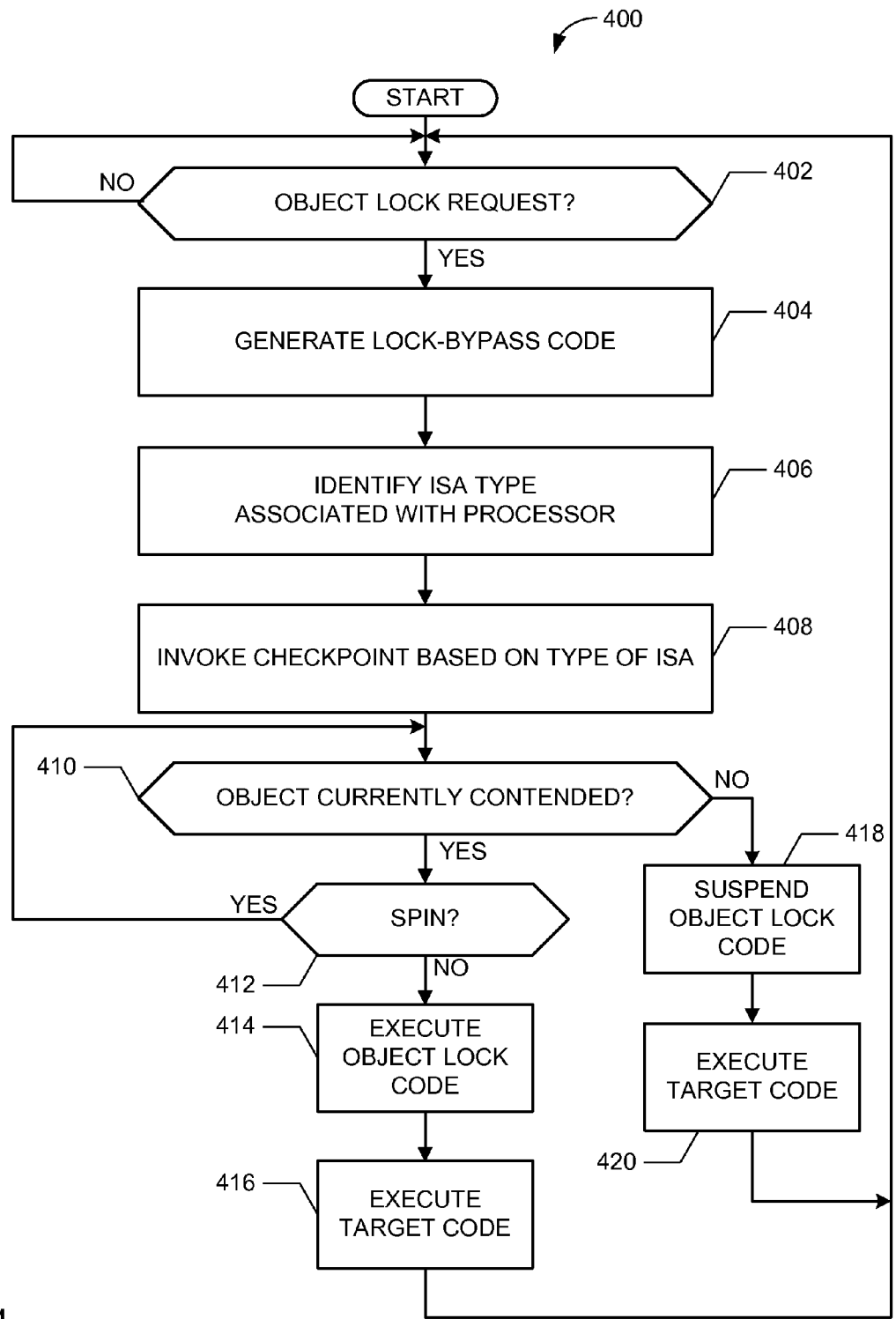
FIGS. 4-9 are example code blocks that may be executed in connection with the example lock-bypass manager of FIGS. 1 and 2A.

The example process 400 of FIG. 4 begins with the exception handler monitor 202 identifying whether an object lock request has occurred (block 402). If no object lock request has occurred, the example exception handler monitor 202 continues to wait for an instance of a lock request (block 402). However, in response to identifying an instance of an object lock request (block 402), the example lock-bypass manager 108 generates lock-bypass code (block 404) and identifies an ISA associated with the example CPU 102 (block 406). As described above, each CPU 102 may employ a unique instruction set to invoke one or more functions of the CPU 102 such as, but not limited to, initiating a checkpoint, ending a checkpoint, aborting a checkpoint and/or reading/querying registers associated with one or more checkpoint attempt(s).

In the illustrated example of FIG. 4, a checkpoint is invoked based on the type of ISA (block 408) and the example object lock tester 210 determines whether the object of interest is currently contended (block 410). If so, the example lock-bypass manager 108 determines whether to spin (block 412), which returns control back to block 410. However, if the example lock-bypass manager 108 determines that spinning should not occur (block 410), then object lock code, such as the example regular lock instructions 305, is executed (block 414) and the target code, such as the example critical code 327 of FIG. 3, is executed (block 416). On the other hand, if the object of interest is currently not contended (block 410), then the example regular lock instructions 305 are suspended from executing (block 418) and the critical code 327 may be executed without a lock (block 420).

Figure 5:
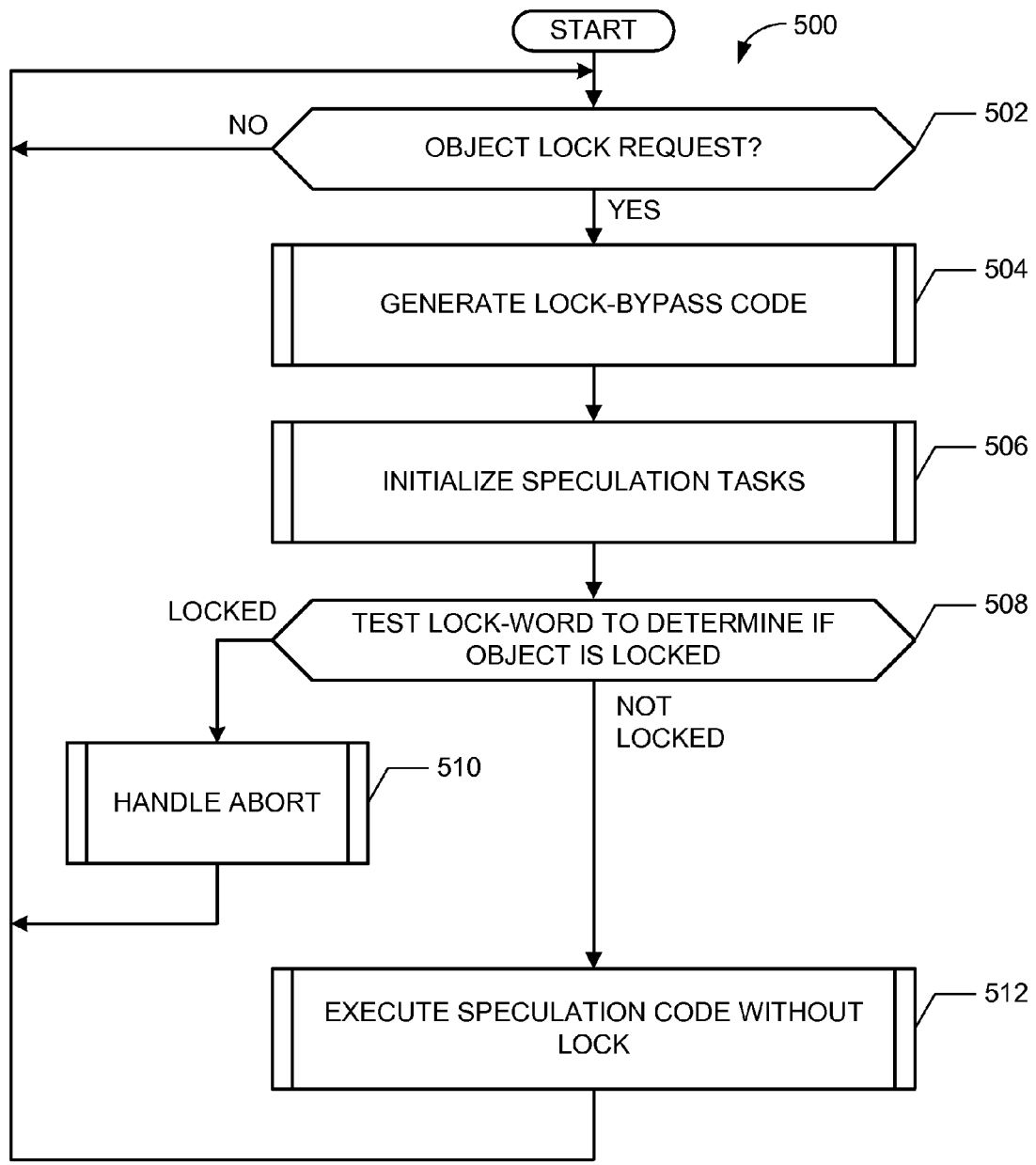

FIG. 5 is an example process 500 showing another example manner in which the methods and apparatus described herein may be implemented. The example process 500 of FIG. 5 begins with the exception handler monitor 202 identifying whether an object lock request has occurred (block 502). If no object lock request has occurred, the example exception handler monitor 202 continues to wait for an instance of a lock request (block 502). However, in response to identifying an instance of an object lock request (block 502), the example lock-bypass manager 108 generates lock-bypass code (block 504) and initiates speculation tasks (block 506), as described in further detail below. To ensure that the object of interest does not already have a separate lock placed thereon, the example lock-bypass manager 108 tests a lock-word to determine if the object of interest is locked (block 508). If the object of interest is already locked (block 508), the example lock-bypass manager 108 handles one or more speculation abort tasks (block 510), otherwise the example lock-bypass manager 108 executes the speculation attempt(s) without placing a lock on the object of interest (block 512).

Figure 6:
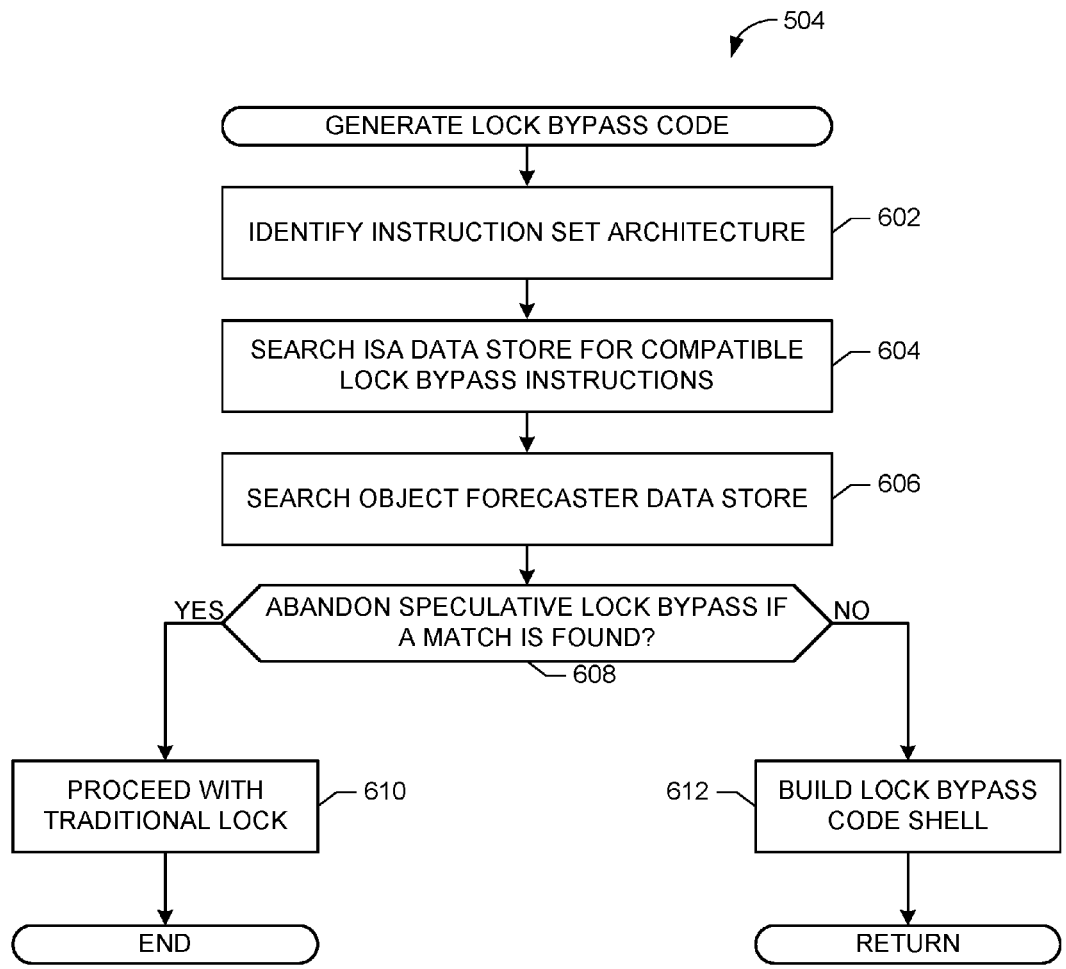

The example process 504 of FIG. 6 illustrates further detail related to generating lock-bypass code of FIG. 5. In the illustrated example of FIG. 6, the example ISA identifier 204 identifies a type of ISA associated with the CPU 102 (block 602). Generally speaking, each CPU may include one or more processor directives that invoke one or more tasks/operations of the CPU. Some processor directives are specific and/or otherwise unique to the CPU and/or the ISA on which the CPU is based. In some examples, the CPU 102 has processor directives that can be called and/or otherwise invoked programmatically. In other examples, the CPU 102 is manufactured in view of a lock-bypass manager, such as the example lock-bypass manager 108 of FIGS. 1 and 2A, to facilitate a hybrid hardware/software approach to speculative execution and lock-bypass activities.

After the example ISA identifier 204 identifies the type of ISA with which the CPU 102 is associated (block 602), the example ISA identifier 204 searches the example ISA data store 206 for specific instruction nomenclature associated with the CPU 102 (block 604). As described above, example nomenclature may include, but is not limited to xB to identify the beginning of speculative hardware execution and invoke a hardware-based checkpoint, xE to identify the end of speculative hardware execution and to invoke atomic commit tasks of buffered memory states, xA to identify an unconditional abort of speculative hardware execution and to invoke a discard of the buffered memory states in favor of the memory states saved during a prior checkpoint operation(s), and/or rxsr to invoke queries of CPU 102 register states in an effort to reveal one or more reasons for speculation failure(s) (e.g., identified contention(s)).

The example ISA identifier 204 also queries the example object forecaster data store 214 for a match of the object of interest (block 606). If a match is found (block 608), any attempt at bypassing one or more lock operation(s) on the object of interest is abandoned and thread execution proceeds with traditional lock operation(s) (block 610). On the other hand, if no match is found in the example object forecaster data store 214 (block 608), then the example bypass code shell builder 208 generates a code shell (block 612), such as the example code shell 300 of FIG. 3, to intercept any immediate requests to acquire a lock on the object of interest.

Figure 7:
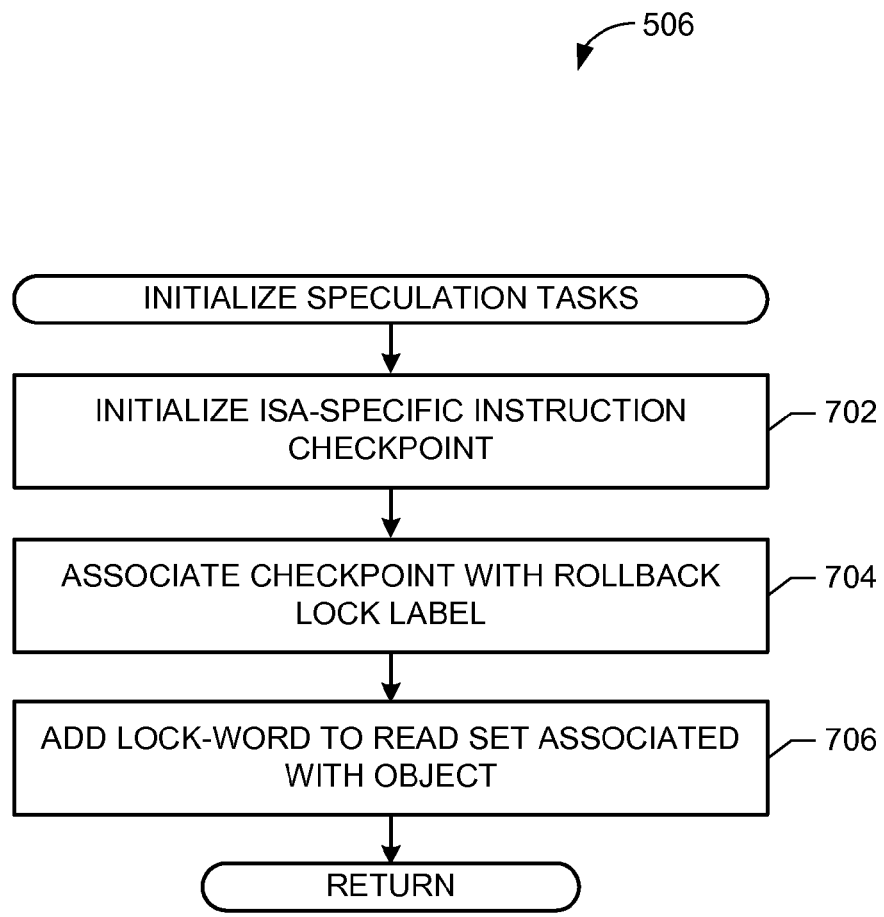

The example process 506 of FIG. 7 begins with initializing an ISA-specific instruction (instruction handler) to establish a hardware-based checkpoint for the CPU 102 (block 702). As described above, the ISA-specific instruction may include xB, which may be added to the example code shell 300, and associated with a rollback lock label (block 704) placed in, for example, the example regular lock label placeholder 304 of FIG. 3. To allow the object of interest to be verified against any other threads that may have acquired a lock, a lock-word may be added to a readset (block 706). The readset is typically employed to identify an object status in view of one or more threads that may, at some future time, request access of the object. In the event that the readset already includes the object of interest (or a pointer to the object of interest), then the requesting thread may identify a potential contention and avoid taking any lock on the object of interest until the prior thread has completed its operation(s).

Figure 8:
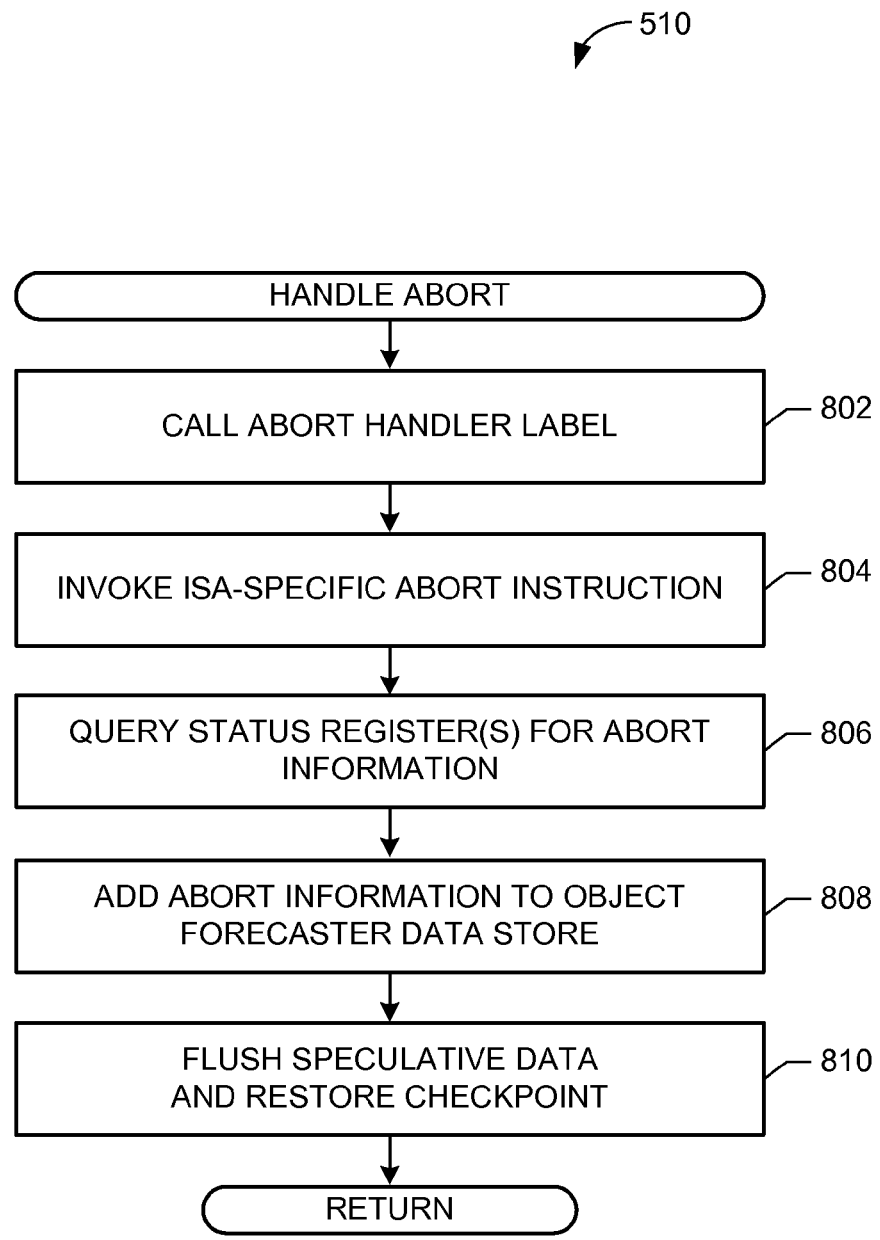

As described above in view of FIG. 5, the lock-word is tested to determine if the object of interest is already locked (block 508). If so, control advances to block 510 to handle an abort. The example process 508 of FIG. 8 illustrates further detail of FIG. 5 related to handling the abort in response to identifying a lock on the object of interest. In the illustrated example of FIG. 8, the object lock tester 210 calls an abort handler label (block 802), such as the abort label from the placeholder 312 of FIG. 3. The example object lock tester 210 also invokes the ISA-specific abort instruction (block 804), such as xA, and invokes the ISA-specific profiling instructions (block 806), such as rxsr. Information retrieved from the rxsr instruction may be added to the example object forecaster data store 214 (block 808) in an effort to prevent future attempts at bypassing lock operation(s) on the object of interest at a future time. In some examples, the object lock tester 210 may observe a threshold number of failed attempts to bypass lock operation(s) on the object of interest prior to adding the object of interest name to the example object forecaster data store 214. Any speculative data and/or register states saved after the checkpoint was initiated are flushed and the checkpoint state is restored (block 810) before control returns to block 502 of FIG. 5.

Figure 9:
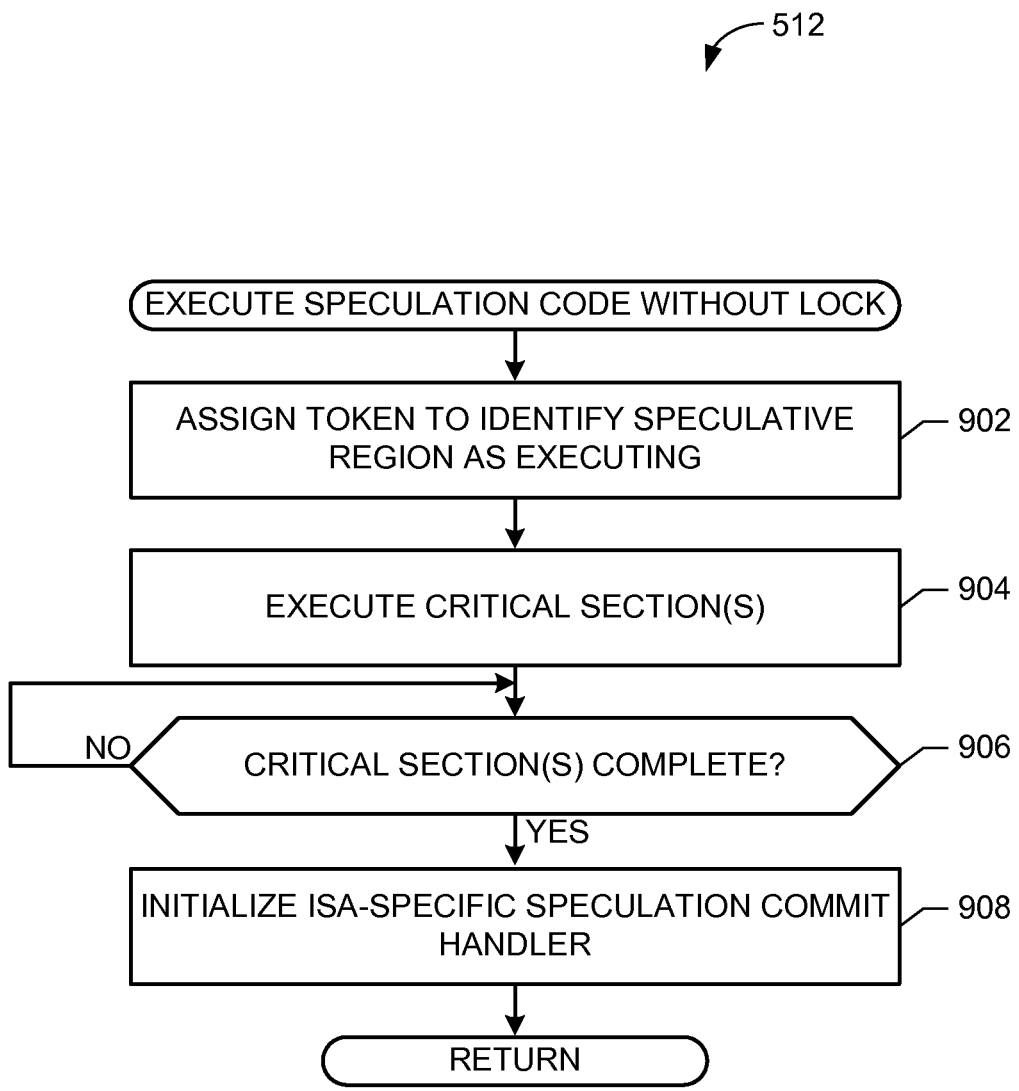

On the other hand, in the event that the lock-word is tested and found to be free of any prior lock (block 508), then the example object lock tester 210 assigns a token to identify that speculative execution is successfully executing (block 902), as shown in FIG. 9. The example speculative code manager 212 allows one or more critical sections of code, which include the object of interest, to execute (block 904). If the critical section of code is not complete (block 906), the example speculative code manager 212 waits for completion, otherwise the speculative code manager 212 invokes an ISA-specific instruction to identify the end of speculative execution (block 908). As described above, an example ISA-specific instruction to identify and/or otherwise invoke an end of the speculative execution includes xE.

Figure 10:
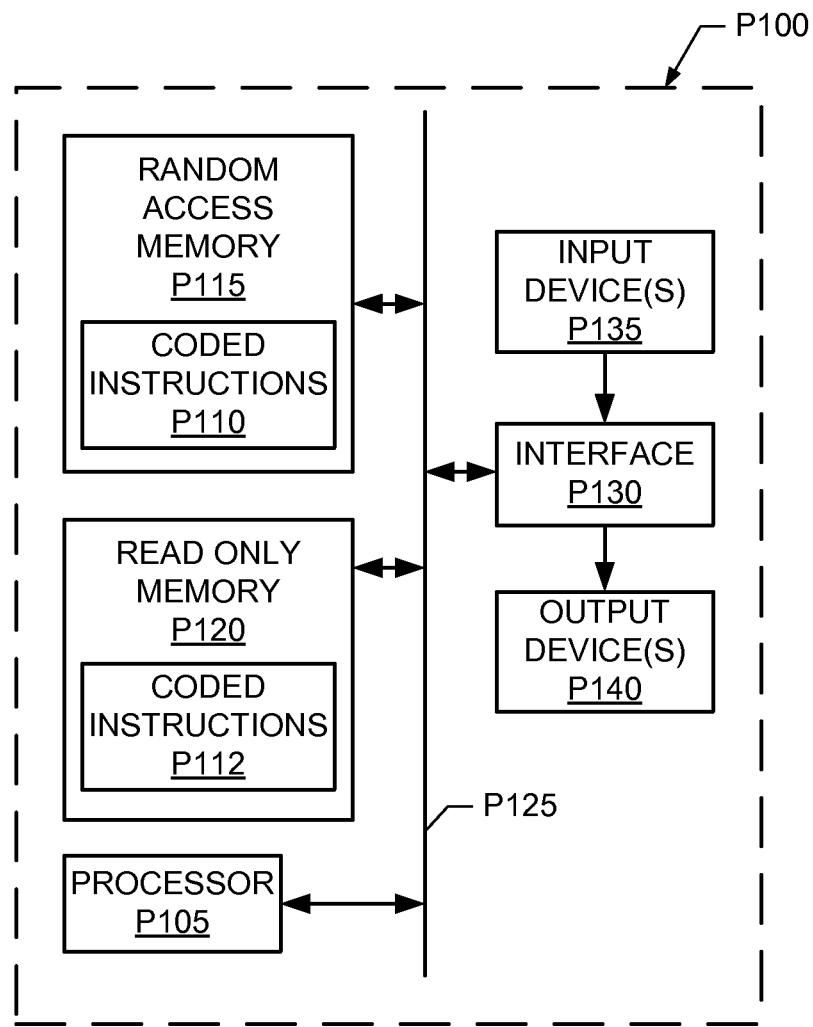
FIG. 10 is a schematic diagram of an example processor platform that may execute the example processes of FIGS. 4-9 and/or the example lock-bypass manager of FIGS. 1 and 2A.

FIG. 10 is a schematic diagram of an example processor platform P100 that may be used and/or programmed to implement any or all of the example CPU 102, runtime environment 104, JIT compiler 106, lock-bypass manager 108, speculation manager 110, exception handler monitor 202, ISA identifier 204, ISA data store 206, bypass code shell builder 208, object lock tester 210, speculative code manager 212 and/or the example object forecaster data store 214 of FIGS. 1 and 2A. For example, the processor platform P100 can be implemented by one or more general-purpose processors, processor cores, microcontrollers, etc.

The processor platform P100 of the example of FIG. 10 includes at least one general-purpose programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example processes of FIGS. 4-9 to implement the example methods and apparatus described herein.

The processor P105 is in communication with the main memory (including a ROM P120 and/or the RAM P115) via a bus P125. The RAM P115 may be implemented by dynamic random access memory (DRAM), synchronous dynamic random access memory (SDRAM), and/or any other type of RAM device, and ROM may be implemented by flash memory and/or any other desired type of memory device. Access to the memory P115 and the memory P120 may be controlled by a memory controller (not shown). The example memory P115 may be used to implement the example ISA data store 206 and/or the example object forecaster data store 214.

The processor platform P100 also includes an interface circuit P130. The interface circuit P130 may be implemented by any type of interface standard, such as an external memory interface, serial port, general-purpose input/output, etc. One or more input devices P135 and one or more output devices P140 are connected to the interface circuit P130.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to control a lock of an object, comprising:
   intercepting, by executing an instruction with a processor, a request to apply the lock on the object;
   identifying, by executing an instruction with the processor, a performance history of the object based on a number of instances of contention;
   reducing computing resources of the processor by, when the number of instances satisfies a threshold:
      generating, by executing an instruction with the processor, a lock bypass for the object to cause speculative execution of target code within the object; and
      reducing, by executing an instruction with the processor, an execution time of the speculative execution by diverting the speculative execution of the target code from a managed runtime environment (MRE) to the processor; and
   preventing, by executing an instruction with the processor, speculative execution by applying the lock on the object when the number of instances does not satisfy the threshold.

2. A method as defined in claim 1, further including identifying a type of instruction set architecture (ISA) associated with the processor.

3. A method as defined in claim 2, further including invoking a status register query associated with the type of ISA when the object is contended.

4. A method as defined in claim 2, further including invoking a profiling instruction associated with the type of ISA when the object is contended, the profiling instruction to identify error register fault codes.

5. A method as defined in claim 1, further including generating a forecaster table containing identifiers of respective objects having the number of instances satisfying the threshold.

6. A method as defined in claim 5, further including preventing speculative execution of the respective objects in the forecaster table in response to detecting the request to apply the lock.

7. An apparatus to control a lock of an object, comprising:
   a bypass code shell builder to:
      intercept a request to apply the lock on the object;
      identify a performance history of the object based on a number of instances of contention;
   a lock bypass manager to reduce computing resources of a processor by, when the number of instances satisfies a threshold, generating a lock bypass for the object to cause speculative execution of target code within the object; and
   an instruction set architecture (ISA) identifier to reduce an execution time of the speculative execution by diverting the speculative execution of the target code from a managed runtime environment (MRE) to the processor, the lock bypass manager to prevent speculative execution by applying the lock on the object when the number of instances does not satisfy the threshold, at least one of the bypass code shell builder, the lock bypass manager, or the ISA identifier including the processor.

8. An apparatus as defined in claim 7, wherein the ISA identifier is to identify a type of ISA associated with the processor.

9. An apparatus as defined in claim 8, wherein the ISA identifier is to invoke a status register query associated with the type of ISA when the object is contended.

10. An apparatus as defined in claim 8, wherein the ISA identifier is to invoke a profiling instruction associated with the type of ISA when the object is contended, the profiling instruction to identify error register fault codes.

11. An apparatus as defined in claim 7, further including an object lock tester to generate a forecaster table containing identifiers of respective objects having the number of instances satisfying the threshold.

12. A tangible computer readable hardware storage device or storage disk comprising instructions to control a lock of an object, wherein the instructions, when executed, cause a processor to, at least:
  intercept a request to apply the lock on the object;
  identify a performance history of the object based on a number of instances of contention;
  reduce computing resources of the processor by, when the number of instances satisfies a threshold, generating a lock bypass for the object to cause speculative execution of target code within the object;
  reduce an execution time of the speculative execution by diverting the speculative execution of the target code from a managed runtime, environment (MRE) to the processor; and
  prevent speculative execution by applying the lock on the object when the number of instances does not satisfy the threshold.

13. A hardware storage device or storage disk as defined in claim 12, wherein the instructions, when executed, cause the processor to identify a type of instruction set architecture (ISA) associated with the processor.

14. A hardware storage device or storage disk as defined in claim 13, wherein the instructions, when executed, cause the processor to invoke a status register query associated with the type of ISA when the object is contended.

15. A hardware storage device or storage disk as defined in claim 13, wherein the instructions, when executed, cause the processor to invoke a profiling instruction associated with the type of ISA when the object is contended, the profiling instruction to identify error register fault codes.

16. A hardware storage device or storage disk as defined in claim 12, wherein the instructions, when executed, cause the processor to generate a forecaster table containing identifiers of respective objects having the number of instances satisfying the threshold.

17. A hardware storage device or storage disk as defined in claim 16, wherein the instructions, when executed, cause the processor to prevent speculative execution of the respective objects in the forecaster table in response to detecting the request to apply the lock.

* * * * *